(12) United States Patent
Penet et al.

(10) Patent No.: US 11,970,295 B2
(45) Date of Patent: Apr. 30, 2024

(54) PROTECTIVE DEVICE FOR THE CONNECTION BETWEEN A DETACHABLE WIRED DRONE AND THE WIRE THEREOF

(71) Applicant: ELISTAIR, Champagne Au Mont d'Or (FR)

(72) Inventors: Timothée Penet, Lyons (FR); Olivier Dubois, Lyons (FR); Guilhem De Marliave, Lyons (FR)

(73) Assignee: ELISTAIR, Champagne Au Mont d'Or (FR)

( * ) Notice: Subject to any disclaimer, the term of this patent is extended or adjusted under 35 U.S.C. 154(b) by 1092 days.

(21) Appl. No.: 16/617,404

(22) PCT Filed: Jun. 21, 2018

(86) PCT No.: PCT/IB2018/054572
§ 371 (c)(1),
(2) Date: Nov. 26, 2019

(87) PCT Pub. No.: WO2018/220607
PCT Pub. Date: Dec. 6, 2018

(65) Prior Publication Data
US 2023/0098757 A1 Mar. 30, 2023

(30) Foreign Application Priority Data
May 31, 2017 (FR) ..................... 17/70560

(51) Int. Cl.
*B64U 50/34* (2023.01)
*B64F 3/02* (2006.01)
*B64U 10/60* (2023.01)

(52) U.S. Cl.
CPC ............... *B64U 50/34* (2023.01); *B64F 3/02* (2013.01); *B64U 10/60* (2023.01); *B64U 2201/202* (2023.01)

(58) Field of Classification Search
CPC .. B64U 50/34; B64U 10/60; B64U 2201/202; B64F 3/02
See application file for complete search history.

(56) References Cited

U.S. PATENT DOCUMENTS 2,409,155 A 10/1946 Schellens et al.
6,325,330 B1 * 12/2001 Lavan, Jr. .............. D07B 1/147
244/33
(Continued)

FOREIGN PATENT DOCUMENTS

CN 204916215 U 12/2015
CN 106585972 A 4/2017
WO 2007141795 A1 12/2007

OTHER PUBLICATIONS

English Machine Translation of Abstract CN106585972.
(Continued)

*Primary Examiner* — Jessica B Wong
(74) *Attorney, Agent, or Firm* — CANTOR COLBURN LLP

(57) ABSTRACT

The invention relates to a protection device for protecting the connection between a detachable wired drone (1) and the wire (5) thereof. This device enables the plug (3) to be reused even when it has fallen many times from a great height and limits the risk of injury and electrocution of people. The device consists of a non-conductive envelope surrounding the electrical contacts of the plug (3), a procedure or a mechanical system that cuts off the power when the plug (3) is detached from the drone (1), a system for mechanical protection against impacts, which can be an energy-dissipating envelope, a parachute-like system (4) for slowing down the fall, or the separation of the plug into a plurality of parts connected by a flexible element. The device according to the invention is particularly applicable (Continued)

to wired drones (1) in order to speed up movement outside the perimeter defined by the wire (5).

20 Claims, 9 Drawing Sheets

(56) References Cited

U.S. PATENT DOCUMENTS

| | | | | |
|---|---|---|---|---|
| 8,602,349 | B2* | 12/2013 | Petrov | B64C 39/024 |
| | | | | 244/17.23 |
| 9,952,022 | B2* | 4/2018 | Ueno | B64C 39/024 |
| 2017/0029105 | A1 | 2/2017 | Ferren et al. | |
| 2018/0050798 | A1* | 2/2018 | Kapuria | B64F 3/02 |
| 2019/0002101 | A1* | 1/2019 | Penet | B64C 39/024 |
| 2019/0334281 | A1* | 10/2019 | Duva | H01R 9/0521 |
| 2020/0091834 | A1* | 3/2020 | Calvez | A63H 27/12 |

OTHER PUBLICATIONS

English Machine Translation of Abstract CN204916215.
International Search Report for Application No. PCT/IB2018/054572.
Written Opinion for Application No. PCT/IB2018/054572.
Communications pursuant to Article 94(3) dated May 12, 2021; EP Application No. 18740906.5; 2 pages (non-English).
Search Report dated Feb. 5, 2018; FR Application No. 1770560; 2 pages.
Written Opinion dated Feb. 5, 2018; FR Application No. 1770560; 6 pages (non-English).

* cited by examiner

PROTECTIVE DEVICE FOR THE CONNECTION BETWEEN A DETACHABLE WIRED DRONE AND THE WIRE THEREOF

CROSS-REFERENCE TO RELATED APPLICATIONS

This application is a national phase application under 35 U.S.C. § 371 of International Patent Application No. PCT/IB2018/054572 filed on Jun. 21, 2018, which claims priority to French Patent Application No. 17/70560 filed on May 31, 2017, the contents each of which are incorporated herein by reference thereto.

TECHNICAL FIELD OF THE INVENTION

The present invention concerns a protective device for the connection between a detachable wired drone and the wire thereof. A drone is a flying machine remotely piloted by means of a control device. The concerned drones are those called rotary wing drones, which comprises all known kinds of scale model helicopters. Wired drones are drones linked to a ground base via a wire, the wire often having the function of the electrical power supply of the drone, or the data transfer, or the role of restraining the drone within a safety area. The wire considered herein serves at least for the electrical power supply of the drone. A detachable wired drone is a drone whose wire can be remotely disconnected, while the drone is in flight, and the drone continues an autonomous flight on batteries.

In some cases, it is practical to use detachable wired drones. Here are two examples:
- a first example concerns the missions of monitoring persons, animals, or more generally moving objects. The drone performs its monitoring mission, plugged to the wire. Its displacement area is limited by the length of the wire. If the operator feels the need to examine a distant event, he orders the detachment of the wire, and directs the drone, powered by the battery, towards the point of interest. The socket must be adapted to absorb repeated shocks, from a great height, and must limit injuries of persons on the ground.
- a second example concerns the missions of monitoring a civil engineering structure in a constrained medium, that is to say in a medium where the progression of the wired drone could be hindered by different obstacles. Then, the wire could be trapped by a particular obstacle. The drone must then be able to be detached from its wire and land on an emergency battery.

PRIOR ART

It is known to use wired drones equipped with backup batteries, for emergency landings in case of a wired power supply defect. It is also known to use drones equipped with a parachute, in case where the drone cannot land in a situation considered suitable by the control device or by the user.

Some patents are interested in systems enabling the drone to land without its wire in emergency situation. The patent WO2007/141795 describes such a system, such that the drone can be detached from its power supply wire and land on an emergency battery without its wired power supply. This document also describes systems for protecting persons on the ground from the fall of the drone: a parachute-type system.

The non-limiting drawbacks of the prior state are:
- the socket is damaged by a repetition of falls from a great height,
- the risk of injuring a person hit by the socket falling from a great height is significant,
- the risk of electrocution of a person hit by the fall of the socket is significant,
- the risk of electrocution of a person handling the damaged socket is significant.

DISCLOSURE OF THE INVENTION

The protective device according to the invention is dedicated to the connection between a wired drone and its wire, such as:
- a socket on the wire and a submount on the drone ensuring at least two functions, power supply of the drone, and take-up of the mechanical forces between the drone and the wire,
- the socket is remotely detachable, while the drone is in flight,
- a ground base powers the wire.

The protective device according to the invention allows overcoming the aforementioned drawbacks: the socket then becomes reusable after many falls, the device reduces the risk of injuring persons, and the device reduces the risk of electrocuting persons.

Indeed, the protective device according to the invention includes:
- a non-conductive envelope which encloses the electrical contacts of the socket: the geometry of the envelope limits the contact of the powered-up elements with the ground or any person on whom the socket would fall,
- a power supply procedure or a mechanical system which cuts off the power supply current at the level of the ground base, at the time when the socket is detached from the drone, which allows turning off the entirety of the wire and the electrical contacts of the socket,
- and a system for mechanically protecting the socket against shocks, in at least one of the following three forms:
  i) an energy-dissipating envelope,
  ii) a system for slowing down the fall, such as a parachute,
  iii) a socket split into several distinct sub-portions, linked by one or more flexible element(s),

Variations of the Invention

According to variations of the invention:
- in order to protect persons, the wire power supply procedure provides for a data measurement or exchange at very low voltage prior to turning on the operation of the system;
- the energy-dissipating envelope includes a movable portion on the wire, which enables an easier plugging of the socket on its submount, and a more efficient energy dissipation during a shock;
- the energy-dissipating envelope is constituted by spikes or fins made of a deformable rubber;
- the energy-dissipating envelope is a removable mechanical fuse;
- the take-up of the mechanical forces takes place in a housing provided under the socket or in the socket;
- the energy-dissipating envelope is compressed when the socket is connected to the drone, thus facilitating the ejection of the socket;

the energy-dissipating envelope is pierced at only one location, devoid of protrusions intended for the take-up of the mechanical forces: the hole enabling the electrical plugging also enables the take-up of the mechanical forces.

the energy-dissipating envelope is an airbag which slows down the fall and dampens the shock.

a parachute includes one hooking point on the drone and one on the socket, the parachute in turn being able to be housed on the drone or on the socket;

a parachute includes two hooking points on the wire: the first one at the level of the center of the canvas of the parachute, the second one at the junction point of the hangers, such that the length of the stretched parachute—canvas and hangers—between these two points is smaller than or equal to the length of the wire between these two points, such that a pull on the wire on either side of these two points mechanically leads to the closure of the parachute on the wire;

the geometry of the socket and the submount enables free rotations of the socket on the submount, thus avoiding the twisting of the wire if the drone performs many rotations on itself;

all of the connection elements on the drone—electrical connection, take-up of the mechanical forces, optional parachute, or optional fastening element of the parachute—are fastened on a platform in free rotation on the drone, thus avoiding the twisting of the wire if the drone performs many rotations on itself;

a procedure orders the ground base to swallow the wire immediately after disconnection between the wire and the drone, for the purpose of limiting the surface of impact of the socket and the wire.

Figure 1:
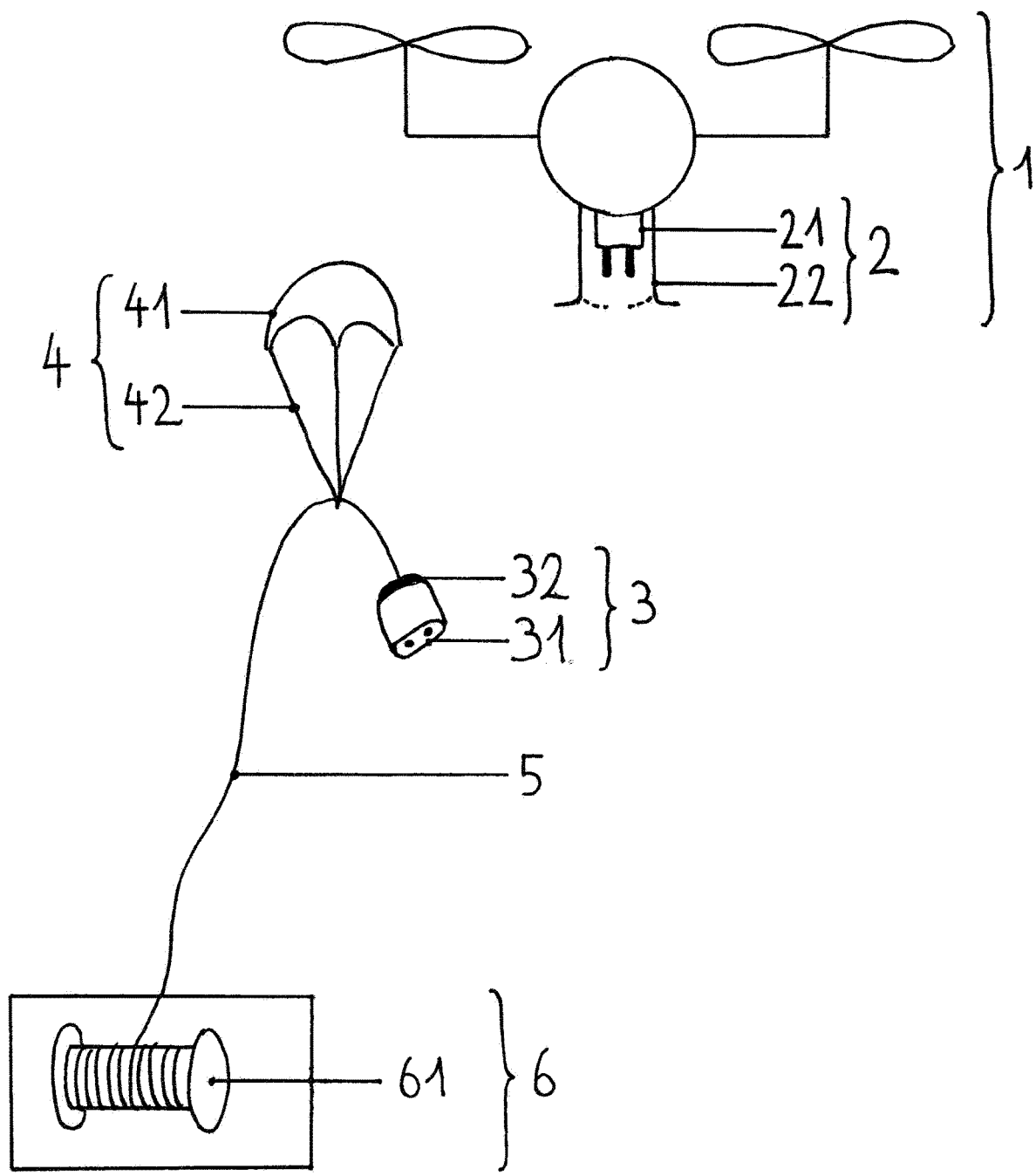
FIG. 1 represents a wired drone (1) provided with a submount (2) which has just released its power supply socket (3). The power supply socket (3) falls, slowed down by a parachute (4). The ground base (6) swallows the wire.

In more detail:

FIG. 1 represents a drone (1) in flight, provided with a submount (2). The portions (21) and (31) of the submount (2) and of the socket (3) correspond to each other and ensure the electrical connection; the portions (22) and (32) of the submount (2) and of the socket (3) correspond to each other and ensure the take-up of the mechanical forces of the socket. The wire (5) falls, provided with a parachute (4). The parachute includes a canvas (41) and hangers (42). The ground base (6) which winds the wire includes a wire (5) winder (61).

Figure 2A:
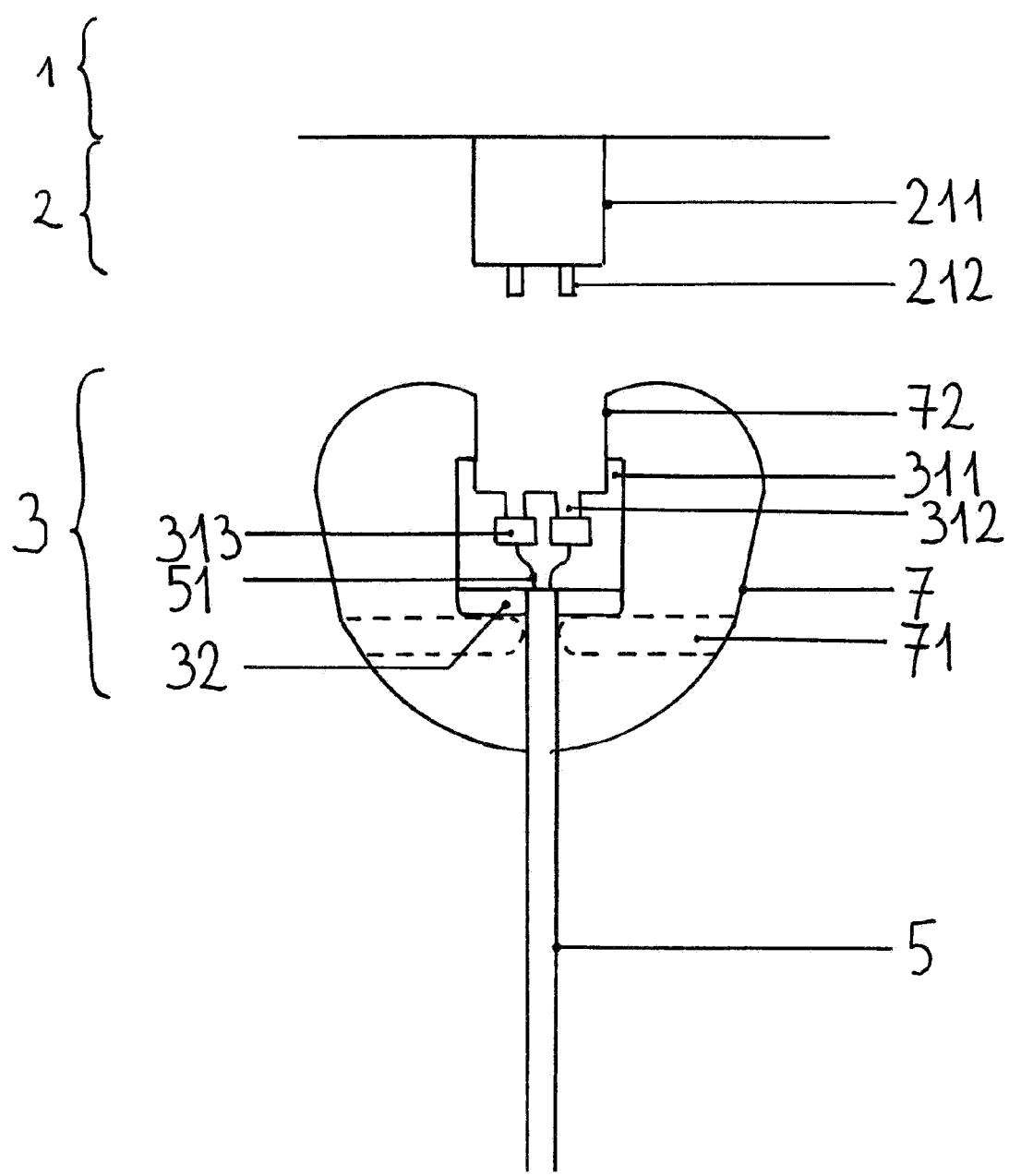
FIGS. 2a, 2b, 2c, 2d represent different geometries of energy-dissipating envelopes (7) according to the invention covering different sockets (3).

FIG. 2a represents a socket (3) provided with an energy-dissipating envelope (7). Protrusions (71) in the envelope enable the non-represented portion (22) of the submount to take up the mechanical forces on the portion (32) of the socket intended for the take-up of the mechanical forces. The portion (31) of the socket intended for the electrical power transmission is constituted by a cylindrical stud made of an insulator bonded to the portion (32), the insulator making a step (311) and encloses the two electrical contacts (313) coming from the two electrical strands (51) of the wire (5). The electrical contacts (313) are at the bottom of two holes (312). The step (311) made of an insulating material is extended by a step (72) of the energy-dissipating envelope, which is also insulating. The portion (21) of the submount is constituted by an insulating stud (211) from which protrude the two male pins (212) corresponding to the holes (312). The portion (22) enabling the take-up of the mechanical forces is not represented, but may as a non-limiting example be constituted by two rotating elbows as suggested in FIG. 1, taking up the force under the portion (32), or by two to three fingers in axial translation also under the portion (32), or by two metal rods in translation perpendicular to their axis within grooves clasping the wire under the portion (32). The wire (5) includes the power transmission strands (51), a strand is intended for the take-up of the mechanical forces, in a sheath. The wire (5) optionally includes other elements such as an optical fiber and the socket (3) and the submount (2) optionally includes the associated connectors.

Figure 2B:
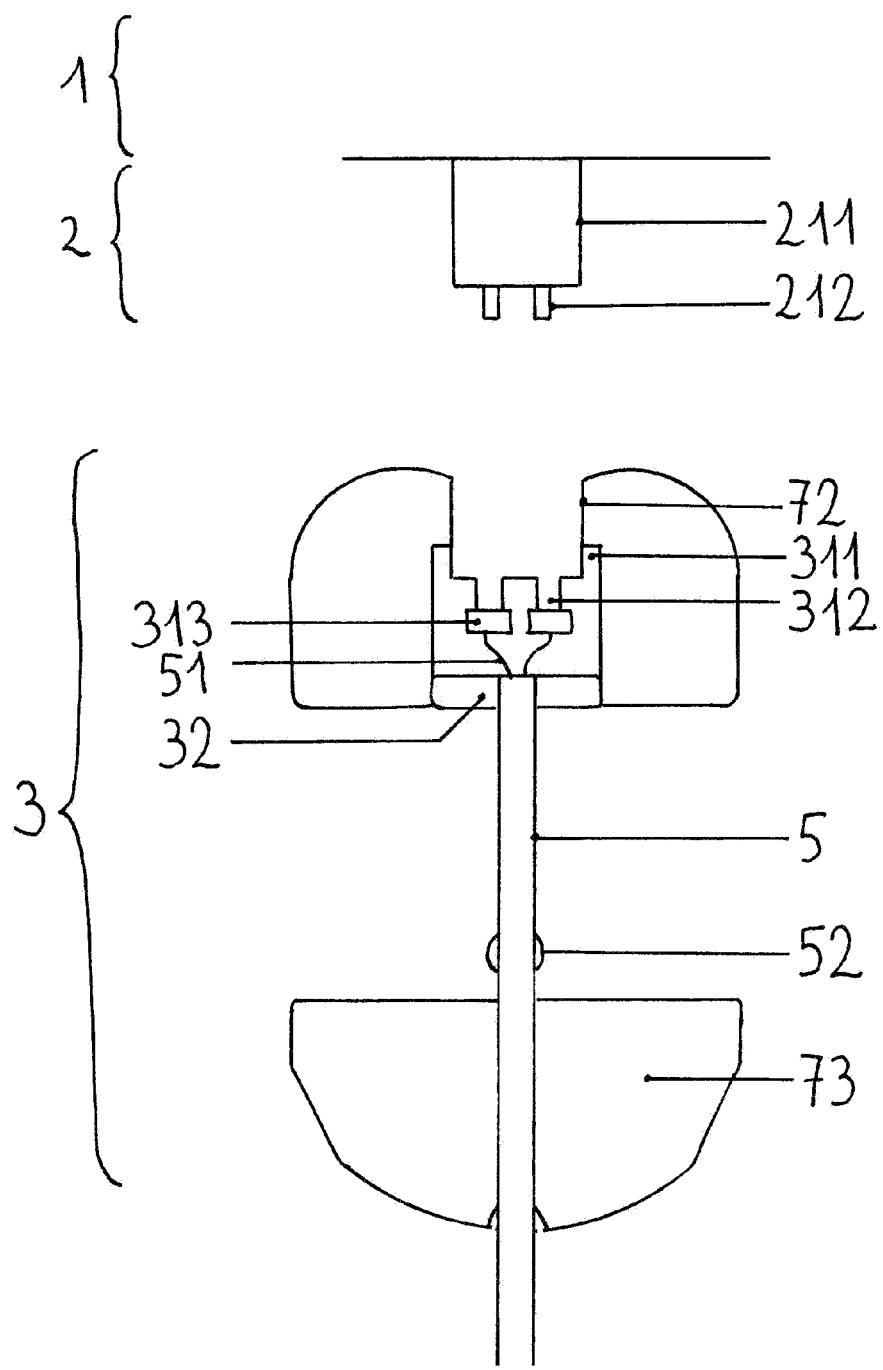

FIG. 2b represents a variant of the previous socket (3). The submount (2), the wire (5), and the top portion of the socket, above the portion (32) are identical. In order to enable an easier plugging of the socket, and a more efficient energy dissipation during a fall, the energy-dissipating envelope (7) includes a semi-spherical movable portion (73) under the socket, sliding on the wire (5) and clipping thanks to the over-thickness (52). The user can firstly plug the top portion of the socket (3), then close the portion (22) of the submount intended for the take-up of the mechanical forces, not represented herein, in order to clip the portion (73) on the spike (52).

Figure 2C:
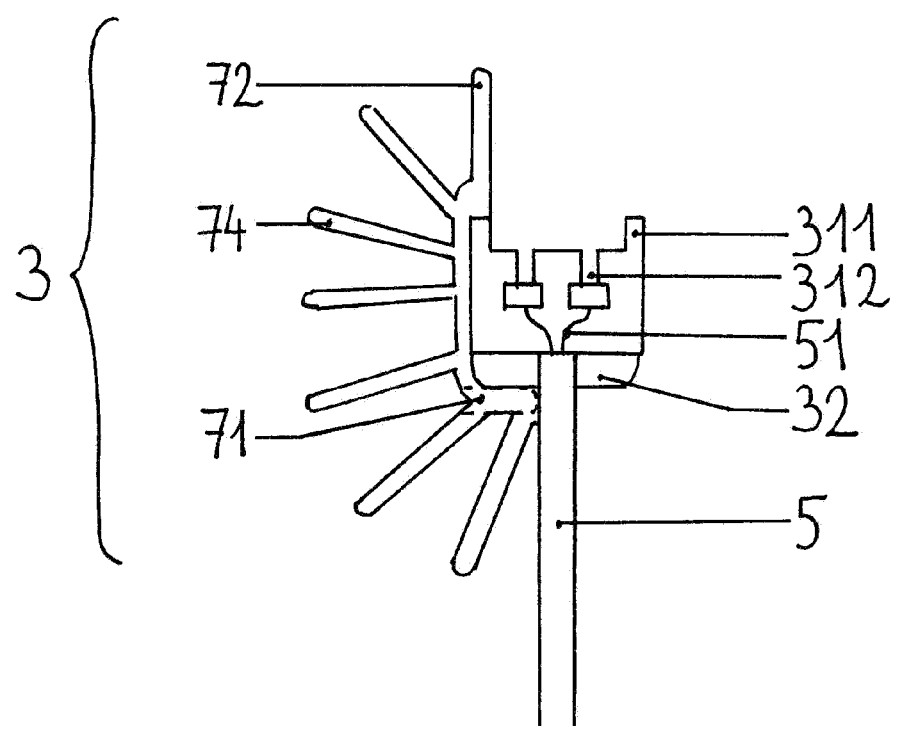

FIG. 2c represents a variant of the socket (3) illustrated in 2a, where the energy-dissipating envelope (7) is constituted by rubber spikes (74). In order not to overload the drawing, only the left section of the energy-dissipating envelope (7) is represented. In reality, the set of ends of the spikes (74) describes a spherical shape.

Figure 2D:
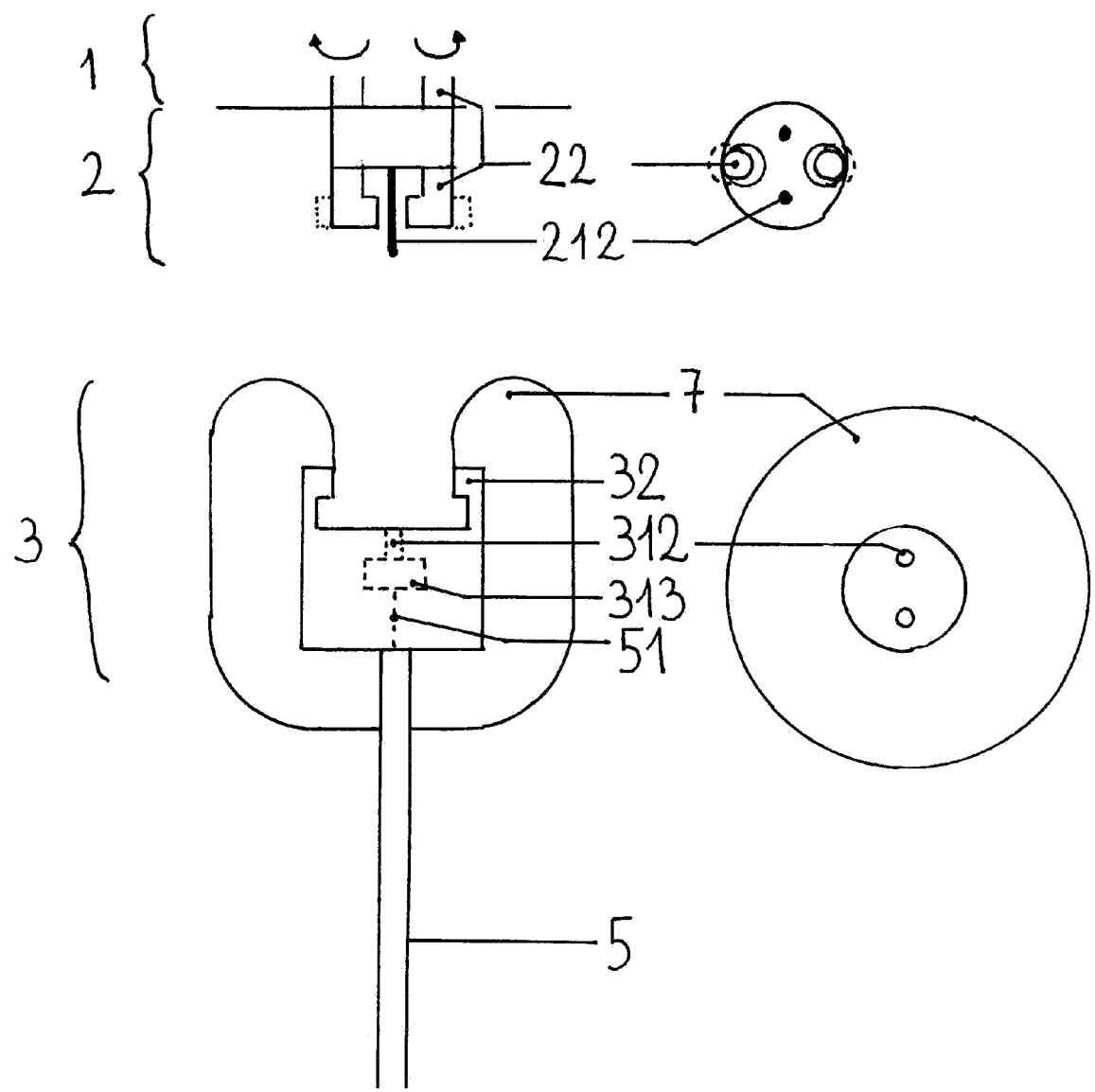

FIG. 2d represents a socket (3) such that the energy-dissipating envelope (7) is made in one-piece and devoid of protrusions (71), which makes it particularly resistant to impacts. The submount (2) includes male electrical pins (212) and the portion (22) intended for the take-up of the mechanical forces is constituted by two cams in rotation, whose axes pass through the insulating block (211) of the submount. The portion (22), herein the cams, is represented in solid line in the position that allows plugging and unplugging the socket (3), and in dotted line in the position that allows securing the socket (3) and the submount (2). The portion (32) enables the take-up of the mechanical forces. The portion (31) intended for the electrical function of the socket is ensured via elements (312), (313) similar to those illustrated in FIG. 2a.

Figure 3A:
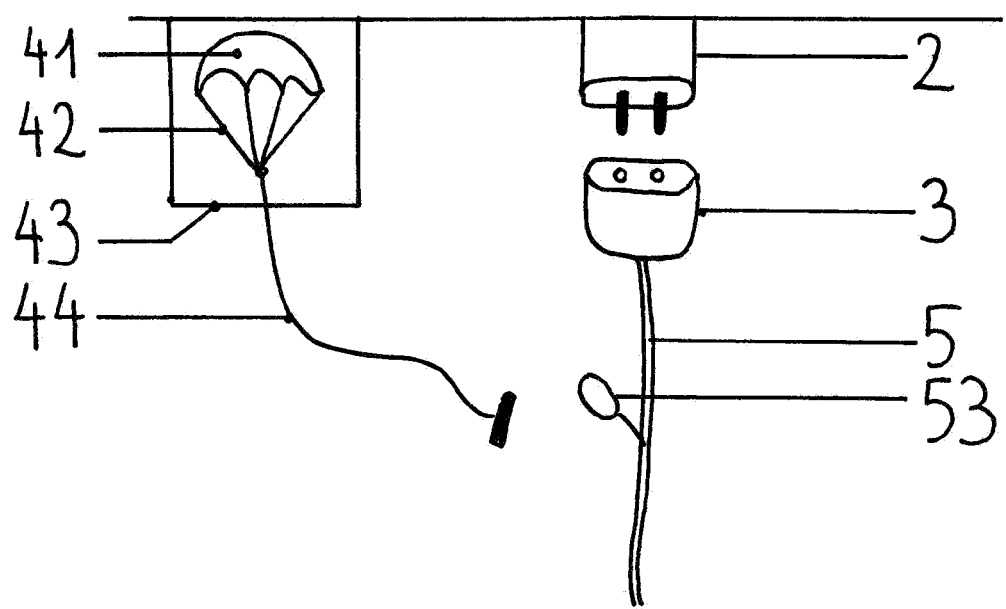
FIGS. 3a, 3b, 3c represent different ways to insert a parachute (4) type system for slowing down the fall of the socket (3).

FIG. 3a represents a socket (3) and a submount (2) whose elements (21), (22), (31), (32) are not detailed, but similar to one of the previous figures.

A box (43) accommodates a parachute (4) which is stored folded in the box (43) when the drone takes off in a wired mode. Linked to the hangers (42), there is seen a cord (44) that the user must tie to the wire (5) under the socket (3) via the buckle (53) before the flight. When the user actuates the wireless mode while the drone (1) is in flight, the socket (3) is released from the submount (2), the socket (3) and the wire (5) fall, tearing out the parachute (4) from its box (43). The canvas (41) inflates and slows down the fall of the socket (3) and the wire (5).

Figure 3B:
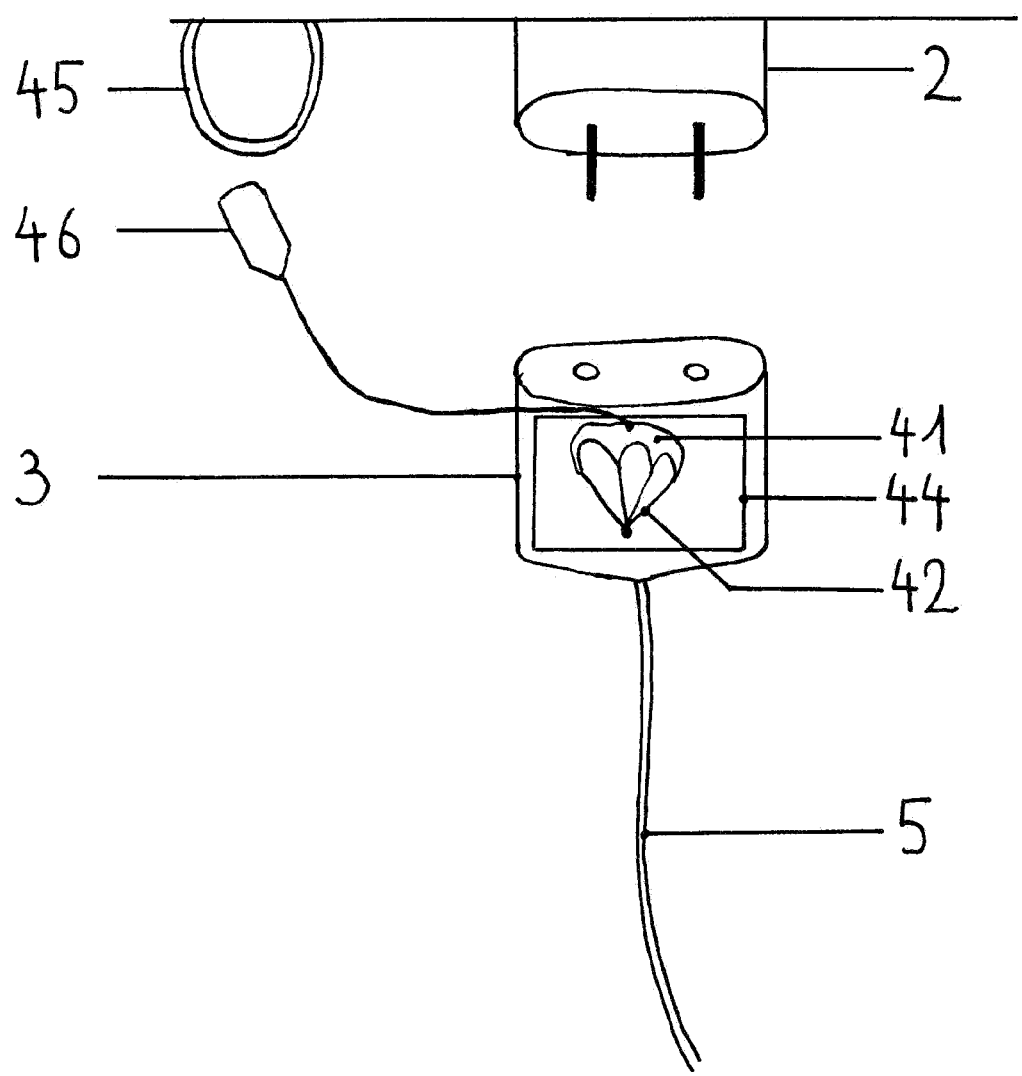

FIG. 3b shows a box (44) located on or in the socket (3). Before a wired flight, the parachute (4) is stored folded in the box (44). The hangers (42) are secured to the socket. A cord secured to the center of the canvas (41) terminates in a scratch system (46) being tied before the flight on a buckle (45) located on the drone (1). When the user actuates the wireless mode while the drone (1) is in flight, the socket (3) falls, the cord retained to the drone (1) via the scratch pulls on the center of the canvas (1) and tears out the parachute from its box (44). The scratch system (46) is dimensioned so as to open once the cord and the hangers (42) of the parachute (4) are stretched.

Figure 3C:
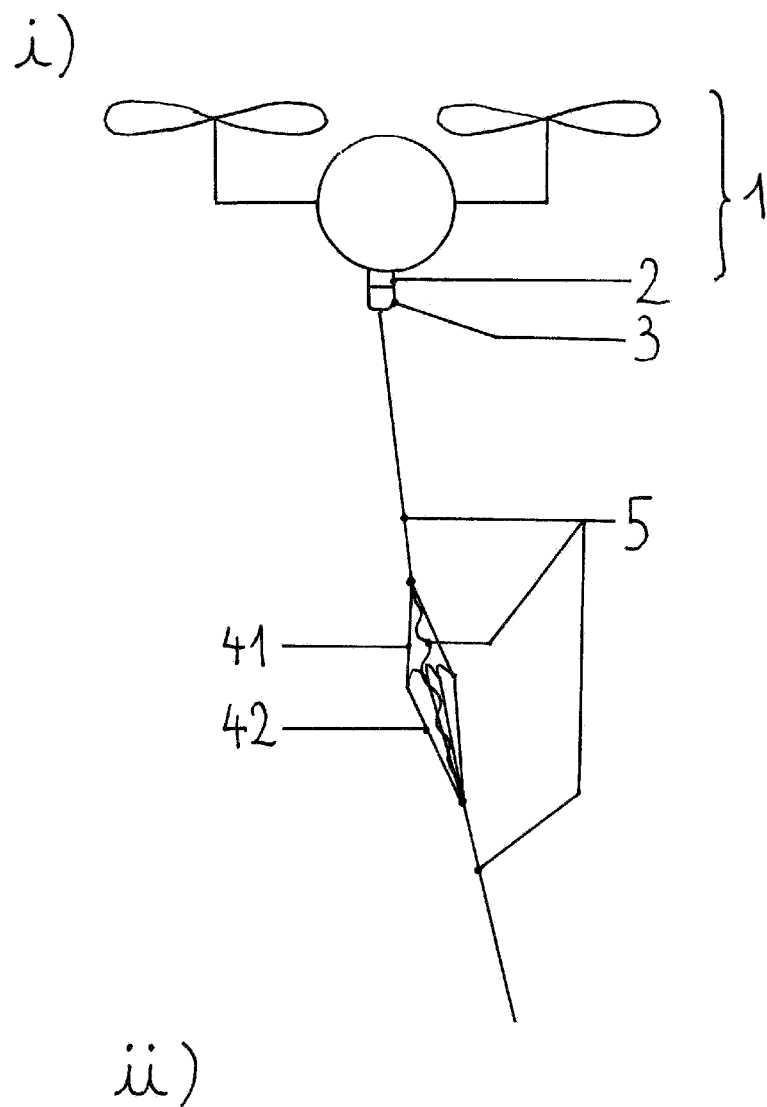
Figure 3C:
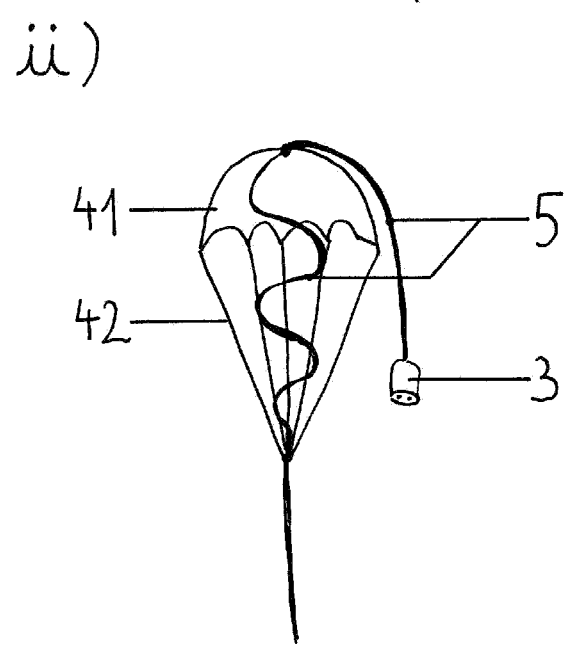

FIG. 3c represents a way to connect the parachute (4) under the socket (3), well known to professionals and amateurs of gliders, which allows closing the parachute (4) in situation i), when the wire is plugged to the drone (1), and mechanically opening it in situation ii), when the wire (5) is detached from the drone. An advantage of this system is that it does not require any plugging or handling before take-off, or any refolding-type handling of a parachute (4) after switching from a wired to a wireless mode. The canvas (41) is fastened at its center on the wire (5), as well as the hangers (42). Figure i) shows how a pull on the wire (5) leads to the mechanical closure of the parachute (4). Figure ii) shows how the absence of a pull mechanically leads to the opening of the parachute (4).

Figure 4:
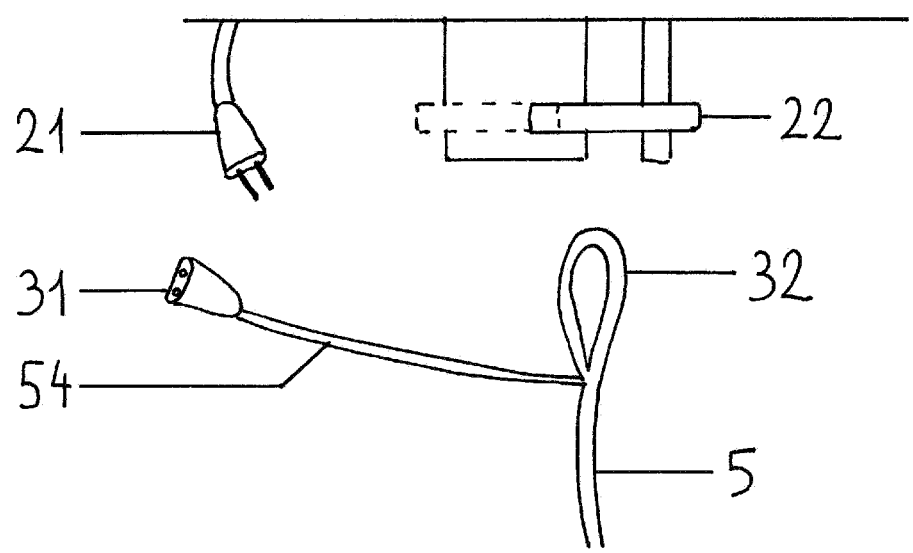
FIG. 4 represents a socket (3) separated into two portions (31) and (32) linked by a flexible element (54).

FIG. 4 represents a socket (3) separated into two sub-portions, herein the portions (32) and (31), linked by a flexible element (54). The portion (31) of the socket dedicated to the electrical connection is lightweight and may be made of soft plastic because it is not subjected to any mechanical force. The portion (32) may be flexible, for example constituted by an aramid strand in a circular plastic ring with a coating having a low coefficient of friction to facilitate the disconnection. The submount is also in two portions, the portion (21) is a lightweight plug that has two male electrical connectors. The portion (22) is a sliding finger actuated by an electric actuator.

Figure 5:
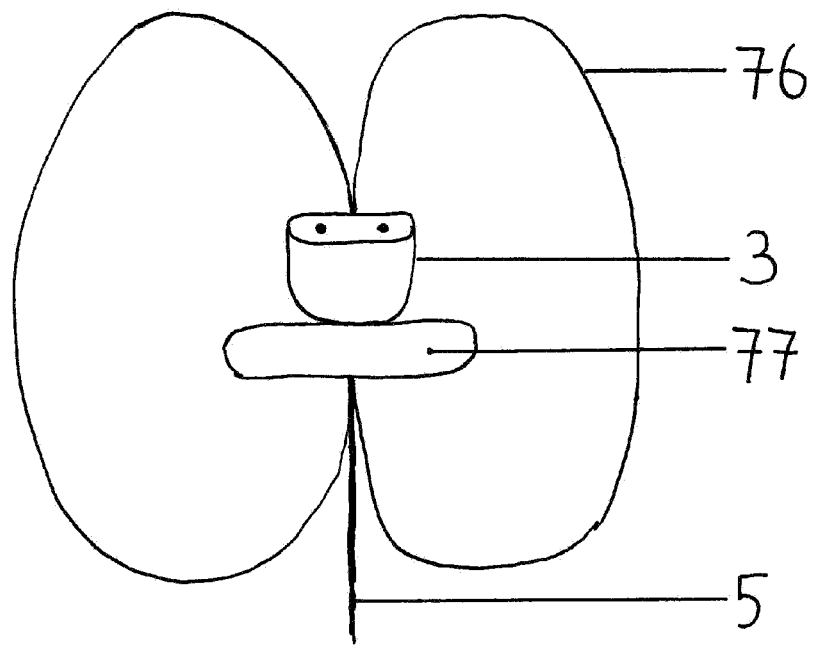
FIG. 5 represents a socket (3) provided with an inflated airbag (76) acting both as a system for slowing down the fall and as an energy-dissipating envelope.

FIG. 5 represents a socket (3) equipped with a gas cartridge (77), preferably containing helium, with an airbag (76) having a spherical shape, represented inflated herein. An advantage of this system is that it constitutes both a system for slowing down the fall, and an energy-dissipating envelope. A drawback is that the entire system or the gas cartridge (77) must be replaced after each fall of the wire (5).

Best Ways to Carry Out the Invention

The embodiments shown in the figures and detailed hereinafter are non-limiting embodiments of the system according to the invention.

To illustrate our invention, all our devices are adapted to the same drone (1)-wire (5)-ground base (6) system.

The drone (1) used in the different embodiments weighs 10 kg, includes 6 rotors and one battery. The ground base (6) includes a wire winder (61). The wire (5) measures 100 meters in length. The wire (5) includes a sheath, surrounding an aramid strand, and two electrical power transmission strands (51). The electrical power transmission strands (51) are also used for transmitting data by the technique called powerline communication technique. The section of the wire (5) is about 3 mm in diameter. One end of the wire (5) is plugged to the ground base (6). At the other end of the wire (5) there is a socket intended to be plugged to the drone (1).

The system for the take-up of the mechanical forces between the drone (1) and the ground base (6) is dimensioned so as to withstand a static pull of 150 kg, that is to say 1500 newton. The characteristics of the system allow clearly representing the invention, but do not in any way limit the perimeter of the invention. In particular, the invention may be intended for a lighter or a heavier drone (1), provided with more or less rotors, linked by a shorter or longer wire (5), including different types of electrical, optical, fluid, or other strands, to a ground base (6) including a wire winder (61) or not.

According to a first embodiment, the protective device according to the invention is made according to FIG.(2b). The portion (32) intended for the take-up of the mechanical forces between the drone (1) and the wire (5) is made by a titanium washer of 1 cm in external diameter and 3 mm in internal diameter, sealed with a resin and the aramid strands of the wire (5) are frayed and embedded in this resin, linked to the upper portion of the socket (3), whose hard-plastic insulating portion is a cylindrical stud of 1 cm in diameter for 1 cm in height. The two holes (312) are 5 mm apart and are 4 mm deep. The electrical contacts (313) are made of copper. The energy-dissipating envelope (7) is an insulating and light foam, which brings the diameter of the assembly to 3 cm. The insulating plastic step (311) measures 5 mm, and the step (72) made of foam measures 1 cm. The movable portion (73), also made of foam, is 2 cm in height, for an external diameter of 3 cm, and an internal diameter of 2.5 mm. This movable portion (73) can slide on the wire (5), but without a clear action from a user, it remains in the same place. The over-thickness (52) is 6 mm in diameter. The insulating portion (211) of the submount is about 1 cm in diameter for 1.5 cm in height, and from which protrude two male electrical pins (212) by about 2 mm. The male electrical pins (212) are mounted on springs. When the socket (3) is plugged, two metal rods of 2 mm in diameter, which are the portion (22) of the submount ensuring the take-up of the mechanical forces, actuated by an electric motor, each sliding between two grooves, and clasping the wire (5) under the washer (32), pressing the electrical contacts (313) against the male electrical pins (212). In the wired flight position, the foam movable portion (73) is clipped against the socket (3) and the metal rods.

Suppose that, when the drone (1) is in flight in the wired mode, the user actuates the wireless mode. The procedure implemented in this embodiment provides in this order for: cutting off the current circulating in the wire (5), switching the drone (1) on the battery, actuating the electric motors which make the metal rods retaining the socket (3) slide. The socket (3) is released, it falls.

If by chance the socket (3) falls on a person or on the ground:
  the geometry of the non-conductive envelope, constituted by both the insulating plastic material in which are pierced the two holes (312) are pierced and the energy-dissipating envelope (7), makes the electrical contacts (313) particularly difficult to access thanks to the elements (312), (311), (72).
  the risk of electrification remains low even if the power supply socket is damaged since the power supply procedure provides for the electrical power supply to stop at the time of detachment of the socket.
  the risk of injury by the shock is low thanks to the presence of the energy-dissipating envelope.

A variation of this embodiment consists in using a simpler geometry, without a movable portion and made in one-piece (FIG. 2a), the foam may be replaced by deformable rubber spikes (FIG. 2c).

Another variation of this embodiment (FIG. 2d) consists in grouping the male pins (212) with the elements ensuring the take-up of the mechanical forces (22), herein cams, in a compact submount (2). Thus, the energy-dissipating envelope (7) of the socket (3) is open only in a single switching, allowing increasing the resistance of the energy-dissipating envelope (7) to repeated shocks, compared with the energy-dissipating envelopes including protrusions (71) of FIGS. 2a, 2c. In FIG. 2d, there is represented an improvement of the invention, which consists in facilitating the ejection of the socket at the time of disconnection: when the socket is plugged to the base, the foam is compressed. When the cams ensuring the take-up of the mechanical forces rotate to release the socket (3), the socket (3) ejects by itself thanks to the foam. The energy-dissipating envelope (7) is herein not bonded against the rigid portion of the socket (3), it is simply nested. This is possible thanks to the use of a neoprene with a high extensibility at the level of the lower portion of the socket.

Useful variations of this embodiment consist in facilitating a large number of rotations of the drone (1) in flight on itself, without twisting the wire (3). The submount (22) can then be mounted on a rotating device, in rotation having a vertical axis relative to the drone. Another solution consists in using geometries of revolution for the socket (3) like the base (2), with coaxial type connectors, well known to those skilled in the general electricity art. The socket (3) can then freely rotate in the submount (2). The frictions of the electrical pins (212) in the holes (312) and on the contacts (313) barely limit the rotation, but the frictions of the portion (22) ensuring the take-up of the mechanical forces of the submount with the corresponding portion (32) may be more limited. The use of tetra-fluoroethylene based treatment on the portion (32) in the configuration of FIG. 2d proves to be efficient; advantageously, the portion (32) may be constituted by a ball or a conical roller bearing.

Finally, a variation of the geometry shown in FIG. 2b consists in removing the movable portion (73) under the socket, and protecting the user from the portion (32) intended for the take-up of the mechanical forces, by inserting into the wire or by over-molding on the wire a semi-rigid portion with a length approximately equal to 2 times the socket. This semi-rigid portion thus prevents a shock between the hard portion (32) and the ground or a person.

According to a second embodiment, the socket (3) and its submount (2) are identical to that described by FIG. 2d, except that:
  the socket (3) does not include an energy-dissipating envelope (7).
  the socket (3) is devoid of sharp-edged elements: the external envelope of the socket (3) is a sphere of about 1.5 cm in diameter, truncated on the top so as to enable fastening to the base (2).

According to the principle illustrated in FIG. 3a, a cubic box (43) of 3 cm by 3 cm by 3 cm, including a parachute (4) whose canvas (41) has a diameter of 50 cm, is added on the drone (1), at 5 cm from the submount (2). The hangers (42) of the parachute are linked to a cord (44). Only the cord protrudes from the box, by about 25 cm.

On the power supply wire (5) of the drone, at 15 cm from the socket (3), there is a buckle (53). Before the flight, the cord protruding from the box is linked to the buckle.

The power supply of the drone (1) is herein provided with the following safety device. A high-frequency very low voltage current, according to the well-known Powerline Communication technique, permanently interacts with the drone (1) and particularly allows detecting or not the presence of the drone (1) at the end of the wire. A passive electronic circuit identifying the drone with accuracy is located on the drone (1). This technique is well known to those skilled in the electronic art, in particular those working on Radio Frequency Identification. The procedure for powering the wire (5) of the drone (1) provides that only the presence of the drone (1) plugged to the wire (5) authorizes the high voltage power supply of the drone.

Suppose that when the drone is in flight and in the wired mode, the user activates the wireless mode. The procedure then provides for the simple rotation of the cams that constitute the portion (22) of the submount (2) intended for the take-up of the mechanical forces. The socket (3) is then released. The drone (1) detects the absence of electricity and switches on the battery power supply. By detaching itself, the power supply device of the drone (1) detects the absence of the drone (1) at the end of the wire (5), and the high voltage power supply is cut off. While falling, the socket (3) drags down the cord (44). The cord (44) tears out the parachute from its box.

While the user focuses on the mission he wants to perform with the drone, the parachute (4) opens and slows down the fall of the socket (3). The procedure provides for the wire (5) winder (61) of the ground base (6) to swallow the wire at a speed of 5 m/s so that the socket (3) falls directly on the ground base (3).

In case of strong wind, a malfunction of the winder (61), or if the drone (1) has released the socket (3) while it was significantly offset from the vertical axis overhanging the ground base (6), the socket (3) may possibly fall on the ground or on a person.

According to this embodiment, the protective device according to the invention includes in particular the following features:
  a non-conductive envelope encloses the electrical contacts (313) of the socket (3).
  the power supply device of the drone (1) cuts off the power supply current circulating in the wire (5) once the socket (3) is detached from its submount (2), this device being particularly protective because the current can be restored in the wire (5) only when the drone (1) is plugged back to the wire (5).
  the socket (3) includes a system for mechanical protection against shocks which is a parachute (4).

A variation of this embodiment consists, according to the principle illustrated in FIG. 3b, in housing the parachute into a small box (44), on the socket (3), or on the wire (5) immediately under the socket (3). The hangers (42) of the parachute are attached to the socket (3) or on the wire (5) under the socket (3). A cord secured to the center of the canvas (41) of the parachute (4) protrudes alone from the box by about 25 cm. A ring (45) at 5 cm from the submount is intended to hook the cord. When the user plugs the socket to the submount, he must also link the cord to the ring (45) via a scratch system (46). The scratch system (46) between the cord and the ring is designed to withstand a pull of 5 Newton. Beyond that, it opens. When the user switches from a wired mode to a wireless mode, and the socket (3) falls, the cord is stretched, tears out the parachute (4) from its box (44), and when the hangers (42) are also stretched the scratch system (46) is stressed beyond the 5 Newton it must withstand: it falls with the cord, the wire (5), the socket (3) and the open parachute (4).

A second variation of this embodiment consists in fastening the parachute (4) on the wire under the socket, according to the technique well known to the amateurs of gliders, at two points, the technique having already been described in the description of FIG. 3c. Herein, the parachute (4) stretched under the socket with its hangers (42) in the configuration i) is a set which measures approximately 1 m, and the point for hooking the center of the canvas (41) of the parachute (4) to the wire (5) is at about 1 m from the socket (3). For the user, an advantage is that there is only one plugging to make before take-off: it is the plugging of the socket (3) to the submount (2). In addition, when the drone (1) returns to the ground base (6) while it has performed a switching from a wired to a wireless mode, there is no need to refold and store the parachute (4) before reuse: the simple tension on the wire (5) acts as a storage.

A third variation of this embodiment, illustrated in FIG. 5, consists in replacing the parachute (4) with a gas cartridge (77) and an airbag (76) type plastic shape. The plastic shape once inflated is about 50 cm in diameter. The entire system: gas cartridge (77), refolded airbag, trigger and inflation system, is grouped together in a cylindrical shape of about 12 cm by 4 cm in diameter. The wired to wireless mode switching procedure triggers the detachment of the socket (3) then the automatic inflation of the airbag (76) around the socket (3). Making miniaturized and low weight airbags is today known to anti-drowning bracelets professionals, and does not need further description. An improvement of the existing system consists in replacing the usual inflation gas—air or nitrogen—with helium. After each use, the entire airbag system must be replaced.

According to a third embodiment, illustrated in FIG. 4, the socket (3) intended to be plugged to the drone (1) is separated into two distinct portions linked by a flexible element (54). In practice, this flexible element measures 15 cm and contains the two power supply strands of the drone (1). The portion (32) that ensures the take-up of the mechanical forces is a ring of 2 cm in diameter and 5 mm in section, made of rubber. The aramid strand present in the wire (5) also circulates inside this ring and ties on itself. On the drone (1) there corresponds a retractable finger, allowing to securing the ring and the drone (1), or on the contrary releasing the ring from the drone (1).

The portion (31) that ensures the power transmission is a plastic plug of 5 mm wide by 8 mm long, including two female pins spaced by 3 mm, and fitted into the plastic portion by 5 mm. The weight of the plug is about 5 g.

When the user plugs the drone (1) to the wire (5), he must therefore, on the one hand, secure the ring and the drone (1) via the retractable finger, and on the other hand, plug the plug to the corresponding submount (21) on the drone. The high-voltage power supply is herein provided with a protective device which consists in preliminarily measuring the impedance of the system thanks to a very low-voltage current.

When the drone is in flight in the wired mode, suppose that the user activates the wireless mode. The procedure then provides for: cutting off the power supply of the wire (1), switching the power supply of the drone (1) on the battery, releasing the ring by the retractable finger. The ring falls and while falling tears out the plug from the submount thereof.

This embodiment therefore comprises the following three features:

- a non-conductive envelope encloses the electrical contacts of the socket (3),
- the power supply procedure cuts off the current in the wire (5),
- the socket is separated into two distinct portions (31) and (32) linked by a flexible element (54) allowing limiting injuries when the socket falls on a person: the distribution of weight into two sub-portions, and the absorption of the energy of the shock in the flexible portion allow reducing the risk of injury.

A variant of this embodiment consists in separating the electrical power supply plug into two plugs for each power supply strand, which allows reducing further the weight of each sub-portion, and reducing even more the risk of injury when the socket (3) falls on a person.

POSSIBILITIES OF INDUSTRIAL APPLICATIONS

The protective device of the invention is prone to be implemented on most wired drones, in order to enable a landing while the wire has been trapped in an obstacle. The device according to the invention is particularly intended for wired drones for which the user wants a switching in the wireless mode allowing quickly getting rid of the action perimeter delimited by the length of the wire.

The invention claimed is:

1. A connection between a wired drone and a wire of the drone, the connection comprising:
    — a socket on the wire and a header on the drone, the socket and the header being configured to provide at least one power supply to the drone and a recovery of mechanical forces between the drone and the wire, the socket being remotely detachable, while the drone is in flight, a ground base being configured to feed the wire,
    — a protection device comprising:
    a) a non-conductive sheath which encloses electrical contacts of the socket, a geometry of the non-conductive sheath limiting any contact between a person and the electrical contacts,
    b) a mechanical system configured to cut off a supply current at the ground base, so that an assembly of the wire and the electrical contacts of the socket are powered off,
    c) a system for mechanical protection of the socket against shocks, taking at least one of the following three forms:
    i) a sheath dissipating a mechanical energy, comprising rubber studs or fins;
    ii) a system for slowing down the fall of the socket, such as a parachute, opening automatically when disconnecting the socket from the drone,
    iii) separation of the socket into several sub-parts connected by one or more flexible elements.

2. The connection according to claim 1, wherein the mechanical system configured to cut off the supply current of the wire is also configured to trigger, prior to the application of operating voltage to the drone, a measurement or an electronic exchange of data between the ground base and the drone at very low voltage.

3. The connection according to claim 1, wherein the sheath dissipating the mechanical energy is a removable mechanical fuse, holding on a rigid part of the socket by simple embedding.

4. The connection according to claim 1, wherein the sheath dissipating the mechanical energy is compressed when the socket is connected to the drone, thus facilitating ejection of the socket.

5. The connection according to claim 1, wherein the sheath dissipating the mechanical energy is an airbag.

6. The connection according to claim 1, wherein the parachute intended to slow down the fall of the socket is housed on the drone.

7. The connection according to claim 1, wherein the parachute is fixed at two points on the wire under the socket, one of the two points being a center of a fabric of the parachute, the other being a junction point of shrouds of the parachute, such that, when the wire is stretched on either side of these two points, the parachute closes on the wire.

8. The connection according to claim 1, wherein a procedure provides for a swallowing of the wire immediately after detachment of the socket from the drone, in order to limit a surface of potential impact of the socket.

9. The connection according to claim 2, wherein the sheath dissipating the mechanical energy is a removable mechanical fuse, holding on a rigid part of the socket by simple embedding.

10. The connection according to claim 9, wherein the sheath dissipating the mechanical energy is compressed when the socket is connected to the drone, thus facilitating ejection of the socket.

11. The connection according to claim 10, wherein the sheath dissipating the mechanical energy is an airbag.

12. The connection according to claim 11, wherein the parachute intended to slow down the fall of the socket is housed on the drone.

13. The connection according to claim 12, wherein the parachute is fixed at two points on the wire under the socket, one of the two points being a center of a fabric of the parachute, the other being a junction point of shrouds of the parachute, such that, when the wire is stretched on either side of these two points, the parachute closes on the wire.

14. The connection according to claim 13, wherein a procedure provides for a swallowing of the wire immediately after detachment of the socket from the drone, in order to limit a surface of potential impact of the socket.

15. The connection according to claim 2, wherein the sheath dissipating the mechanical energy is compressed when the socket is connected to the drone, thus facilitating ejection of the socket.

16. The connection according to claim 2, wherein the sheath dissipating the mechanical energy is an airbag.

17. The connection according to claim 2, wherein the parachute intended to slow down the fall of the socket is housed on the drone.

18. The connection according to claim 2, wherein the parachute is fixed at two points on the wire under the socket, one of the two points being a center of a fabric of the parachute, the other being a junction point of shrouds of the parachute, such that, when the wire is stretched on either side of these two points, the parachute closes on the wire.

19. The connection according to claim 2, wherein a procedure provides for a swallowing of the wire immediately after detachment of the socket from the drone, in order to limit a surface of potential impact of the socket.

20. The connection according to claim 3, wherein the sheath dissipating the mechanical energy is an airbag.

* * * * *